Aug. 13, 1935.   W. F. ANGER   2,010,838
ILLUMINATING DEVICE
Filed July 28, 1934
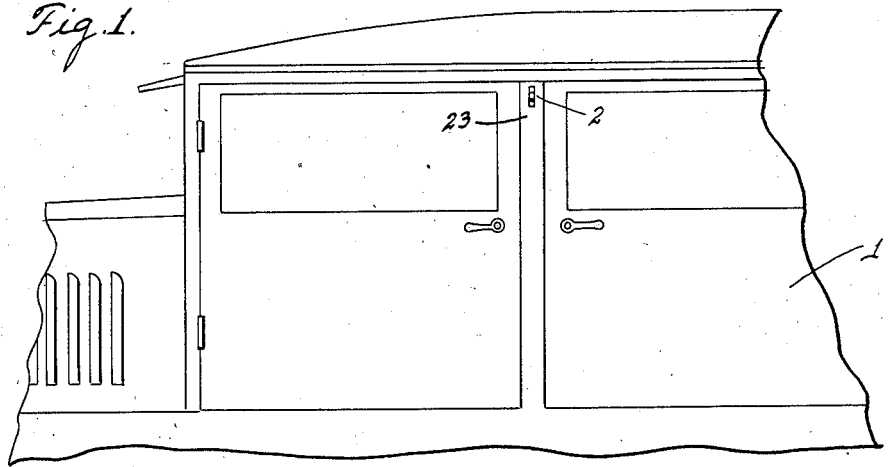
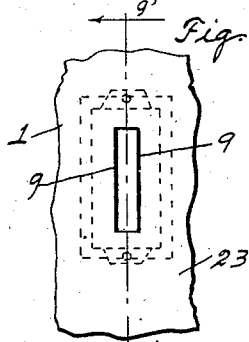
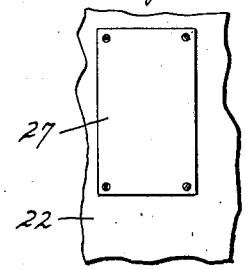
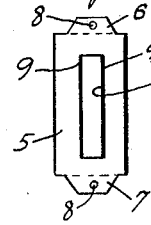
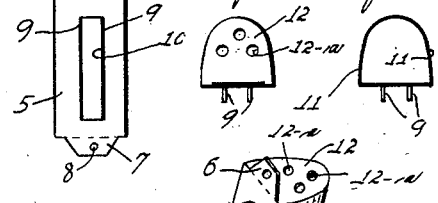
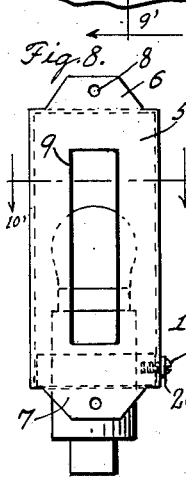
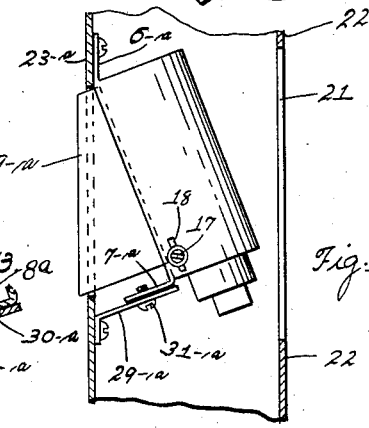
Inventor —
William F. Anger Patented Aug. 13, 1935

2,010,838

UNITED STATES PATENT OFFICE 2,010,838

ILLUMINATING DEVICE

William F. Anger, Berkeley, Calif.

Application July 28, 1934, Serial No. 737,425

2 Claims. (Cl. 240—8.2)

My invention relates to improvements in an illuminating device adapted for application to an automobile or other road vehicle for illuminating the hand and arm of the operator when it is extended, during night driving or when otherwise desired, for indicating certain intended movements of the machine, such as stopping, turning to left or turning to right, and the like; and an object of the invention is the provision of an illuminating device for the purpose mentioned, that may readily be installed in the side wall, or door, of an automobile, and, when so installed, will effectively function for illuminating the arm and hand of the operator while the same is extended out from one side of the machine.

With the foregoing and other objects and purposes in view which will appear as the description proceeds, my invention resides in the formation and arrangements of parts and elements and in their application to and in combination the body of an automobile as hereinafter described and claimed, it being understood that changes in the precise embodiment of the invention herein disclosed can be made within the scope of what is claimed without departing from the spirit of the invention.

In the accompanying drawing—

Figure 1 is a diagrammatical drawing representing the upper mid portion of the left-hand side of an automobile, in the side wall of which a unit of the present illuminating device is installed;

Figure 2 is a somewhat enlarged view of an exterior fragmental portion of the side wall of the automobile and the housing element forming a portion of the present invention, attached thereto;

Figure 3 is an interior view in elevation of a fragmental portion of the side wall, showing a plate attached thereto, the object of which will hereinafter be described;

Figure 4 is a front elevation of the housing element;

Figure 5 is a top plan view of the housing element;

Figure 6 is a bottom view of the housing element;

Figure 7 is a view in perspective of the housing element;

Figure 8 is a further enlarged view in elevation of the housing element with the lighting element installed therein;

Figure 9 is a vertical sectional view on line 9'—9' of Fig. 2, also showing the lighting element disposed in position in the housing element, the lighting element being shown in elevation;

Figure 10 is a cross section on line 10'—10', Fig. 8;

Figure 11 is a median horizontal sectional view through the insulation block;

Figure 12 shows a side elevation of a slight modification of the device installed in the side wall of the machine, the latter being shown partly in section; and Figure 13 is a vertical section of portions associated with the modification.

Referring to the drawing in detail, throughout which like reference characters designate like parts:

The numerals 1 and 2 designate, respectively, a portion of the left-hand side of the body of an automobile, and my present illuminating device attached thereto intermediate the front and rear doors thereof;

The illuminating device 2 comprises a housing element 3 and a lighting element 4.

The housing element 3, which I preferably form of comparatively thin sheet metal, comprises a front wall 5 terminating vertically in securing clips 6, 7, which have screw openings 8, and a pair of vertically extending lips 9 disposed on opposed margins of a vertically extending slot 10 formed in the mid portion of said front wall 5, side walls 11 converging rearwards thereby forming a rear housing wall portion oval in cross section as indicated in Figs. 5, 6, 7 and 10, and a top 12 provided with vents 12a.

The lighting element 4 embodies a conventional filament bulb 13 and socket 14, and an insulating block 15 preferably formed of fibrous material and provided with a central opening 16 through which the socket 14 projects and in which said socket is intended to be normally frictionally bound against accidental movement relative to said block.

The insulating block 15, which is adapted to electrically insulate the lighting element from the housing element, is intended to fit snugly but movably against the inner surface of walls of the housing element and locked therein against accidental movement relative thereto by means of a screw 17 extending through a vertically extending slot 18 in the housing element and a distance into a threaded opening 19 formed in the insulating block. By proper manipulation of the screw 17 the lighting element may be unlocked and moved vertically relative to the housing element, which vertical movement and adjustment of the lighting element being limited by the length of the slot 18. The screw 17 is preferably provided with a washer 20 to better engage the housing wall at the margins of said slot.

The illuminating device is installed in its position on the machine by projecting it through an opening 21 formed in the inner sheathing or upholstery 22, and its front wall 5 disposed to bear against the inner surface of the outer sheathing 23, with the slot 10 in registration with a slot 24 formed in said outer sheathing, through which slot 24 the lips 9 are disposed to project (see Fig. 9), and removably secured to said outer sheathing by means of screws 25 projecting through the openings 8 and into threaded openings 26 formed in said outer sheathing. A plate 27 provided with securing screws 28 is provided for closing the opening 21 after the installation of the device, which plate may be removed in event it is desired to remove the illuminating device for purpose of adjustment or for any other purpose.

In the modification illustrated in Figs. 12, and 13 the device is shown inclined rearwardly downwardly for directing the light rays emanating from the filament of the lighting element 4 at an angle downwards instead of horizontally outwards as in the case when the device is disposed vertically as shown in Fig. 9. Obviously, the device may be disposed at any angle relative to the body of the machine found appropriate for directing the light rays onto the arm of the operator when the same is extended for signaling any contemplated change in the movement of the machine. I effect the rearwardly inclination above referred to by bending the securing clip 6a rearwards and the clip 7a forwards, as illustrated in Fig. 12, and inserting a bracket 29a provided with a longitudinally extending slot 30a intermediate the clip 7a and the outer sheathing 23a. A screw 31a projected through the slot 30a and threadedly engaging the opening 8a in the clip 7a, provides means for adjustably securing the clip 7a and bracket 29a together.

A lens, or other transparent means, such, for instance, as a glass window (not shown), may be installed, if desired, in or adjacent the slot 10 to close said slot against the entrance therethrough of dust, or the like, from the exterior into the housing element 3, said lens, or glass window, may also be employed for increasing or decreasing, as the case may be, or for deflecting or directing the light rays emanating from the bulb 13 through the slot 10.

In the modified form of the device the lips 9a are formed wider at the bottom than at the top so as to provide them with vertically extending outer edges in parallelism with outer surface of the sheathing 23a.

While I have shown the slot 18 in the housing element 3 to be closed at both its upper and lower ends, the lower end may, if preferred, be formed to extend clear through the lower margin of the side wall 11; also, that, while I have shown a slot only on one side of the said housing element, one may be formed on each side thereof.

The lighting element 4 may be electrically connected in series, or otherwise, with the headlight circuit of the machine, or, a separate circuit may be provided connected up to the same electrical supply, or the same may be electrically operated in any other manner found desirable or expedient.

I claim:

1. An illuminating device comprising a housing element having a vertically extending front wall portion terminating vertically in opposed securing clips for securing said housing element to the body of an automobile, an insulating block vertically movably disposed inside said housing element, said insulating block supporting a filament bulb, and a screw projecting through a vertically extending slot in said housing element and into said insulating block, said screw adapted for binding said insulating block to said housing element against vertical movement relative thereto, said screw operable for releasing said binding of said illuminating block to said housing element and thereby permitting said block to be moved vertically for moving said bulb into proper registration with a vertically extending slot formed in said front wall portion, whereby light rays emanating from said bulb will pass through said last named slot, said last named slot being disposed distant from said first named slot.

2. The combination with the side wall of the body portion of an automobile, said wall having a slot extending therethrough and having a bracket secured to one face side thereof below said slot, of a housing element having an upper securing clip secured to said face side above said slot and having a lower securing clip secured to said bracket, said housing element having a slot in registration with said first named slot, and a lighting element vertically movably disposed inside said housing element whereby light rays emanating from said lighting element will be projected through both said slots.

WILLIAM F. ANGER.